May 26, 1959

C. F. AULT 2,888,634

ELECTRIC CIRCUIT

Filed July 9, 1957

INVENTOR.
CYRUS F. AULT
BY
Darby & Darby
ATTORNEYS.

United States Patent Office 2,888,634
Patented May 26, 1959

2,888,634

ELECTRIC CIRCUIT

Cyrus Frank Ault, Clifton, N.J., assignor to Allen B. Du Mont Laboratories, Inc., Clifton, N.J., a corporation of Delaware Application July 9, 1957, Serial No. 670,680

3 Claims. (Cl. 323—29)

This invention relates to regulating systems and the like, and more particularly, to a novel error sensing circuit for use in such systems.

In general, a regulating system may be considered as being composed of two basic units. The first basic unit is connected between the input and the output of the regulating system and is designated as the controlling device. This device performs the function of correcting the actual value of the regulated quantity to cause it to assume its desired value. The second basic unit is usually connected to the output of the regulating system and to the controlling device, for control thereof. This unit is designated as the error sensing device, since it functions to compare the actual value of the regulated quantity with the desired value of the regulated quantity, to produce an error signal which corresponds to the difference between the two values. The output of the error sensing device, at which the error signal appears, is connected to the controlling device, so that the latter device may function to maintain the output of the system at the desired value.

The present invention is primarily concerned with a novel electric circuit arrangement which may function as the error sensing device in regulating systems, wherein the actual values of the regulated quantity are transformed by suitable transducing means into electric signals, such as voltage or current signals. Where the regulating system is a voltage or current regulator, it, of course, is not necessary to employ the aforesaid transducing means, since the regulated quantity is already in suitable form for direct application to the error sensing circuit. In order that the error sensing circuit may perform its required function, it is necessary that a "reference," or "standard," source be employed. This reference source must produce a signal which corresponds to the desired value of the regulated quantity, so that upon comparison with the signal corresponding to the actual value of the regulated quantity, the error signal will be produced. In regulating systems, such as voltage or current regulators, reference sources, such as batteries or voltage regulator tubes, have been used to produce the reference signal. However, in many applications, these reference sources have been found to be unsuitable, since their output signals do not remain constant over long periods of time. For example, the voltage produced by the battery type of reference source has been found to decrease as the battery ages, with the result that the accuracy of the regulating system is correspondingly impaired. Reference sources, such as voltage regulator tubes, also suffer from the limitation that they are usually limited to a certain range of operating voltages, over which their output remains substantially constant.

Accordingly, it is a primary object of this invention to provide an error sensing circuit which is extremely stable in operation over long periods of time and which is relatively unaffected by external conditions, such as temperature, pressure and the like.

It is a further object of this invention to provide an error sensing circuit which is accurate and reliable in operation and which is easily manufactured and maintained.

Briefly, the error sensing circuit of the invention comprises an electron discharge device having means for producing a deflectable electron beam and deflection means for deflecting the beam. Permanent magnet means are provided adjacent the electron beam and serve to deflect the beam by an amount corresponding to the desired value of the regulated quantity. The deflection means, which may be electrostatic deflection plates or electromagnetic deflection coils, are adapted to be coupled to a source of signals corresponding to the actual value of the regulated quantity, so that the electron beam is adapted to be deflected by an amount corresponding to said actual value. The net deflection of the beam, which is the difference between the deflections caused by the magnet means and the deflection means, then corresponds to the difference between the desired and actual values of the regulated quantity. By the term "corresponding," or "corresponds," as used in this specification, is meant any mathematical relationship between the quantities involved, and may therefore include both linear and non-linear relationships. The beam producing means of the electron discharge device may include a pair of anodes, so located within the device, that the difference between the signals appearing at the anodes due to the electron beam corresponds to the net deflection of the beam. Differential circuit means are provided which have an input coupled to the anodes of the discharge device and an output adapted to be coupled to a controlling device. An error signal which corresponds to the difference between the signals appearing at the anodes, and hence the difference between the actual and desired values of the regulated quantity, is produced at the output of the differential circuit means. Since the permanent magnet means forming the reference, or standard, source is stable under virtually all conditions except temperature change, the invention also contemplates the use of novel temperature compensating means to insure that variations in temperature will not change the amount of deflection of the electron beam due to the magnet means.

In one embodiment of the invention, the beam producing means of the electron discharge device produces a beam of substantially constant intensity, so that the signals appearing at the anodes of the device are D.C. signals. The differential circuit means for this embodiment may then comprise a conventional D.C. difference amplifier. In another embodiment of the invention, the beam producing means produces an electron beam of regularly varying intensity, so that the signals appearing at the anodes are A.C. signals. The differential circuit means for this embodiment may then comprise a transformer and a demodulator, the transformer serving to differentially couple the anodes of the discharge device to the demodulator.

The invention will be further understood by reference to the accompanying drawing, in which.

Figure 1:
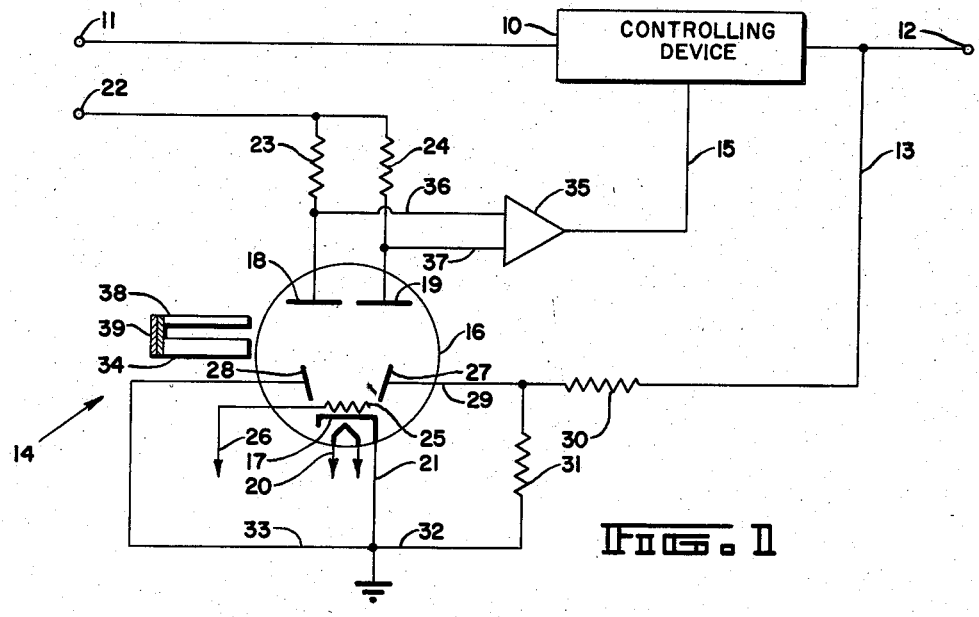
Fig. 1 is a schematic circuit diagram of one embodiment of the invention.

Referring now to Fig. 1 of the drawing, the novel error sensing circuit of the invention is shown in a voltage regulating system having a controlling device 10 connected between the input 11 and the output 12 of the system. In such an arrangement, the device 10 serves to maintain the voltage at output 12 at a desired value. The controlling device 10 may consist of any suitable voltage controlling means, such as conventional electron tube, magnetic amplifier, or transistor circuits, which function to control the output voltage in accordance with an applied error signal. A lead 13 connects the output 12 of the system to the input of an error sensing circuit 14 and a lead 15 connects the output of the error sensing circuit to the controlling device 10, so that the error signal from the error sensing circuit may be used to control the controlling device.

The error sensing circuit 14 includes an electron discharge device 16 which may be a beam deflection, or sheet beam, tube, such as a General Electric type 6AR8. As shown, the tube 16 includes a cathode 17 and a pair of anodes 18 and 19, which are symmetrically located with respect to the undeflected position of the beam. The cathode 17 is indirectly heated by a filament 20 and is connected directly to ground by a lead 21, while the anodes 18 and 19 are connected to a source of plate supply voltage (not shown) by means of lead 22 and plate resistors 23 and 24. A control grid 25 is provided in the tube to control the intensity of the electron beam and is connected to a source of D.C. bias voltage (not shown) by means of a lead 26. Electrostatic deflection plates 27 and 28 are mounted in the tube 16 to deflect the electron beam from its neutral, or undeflected, position, in which equal D.C. voltages appear at anodes 18 and 19.

Deflection plate 27 is connected to the output 12 of the regulating system through leads 13 and 29 and a voltage dividing network consisting of resistors 30 and 31. Resistor 30 is connected to the system output 12 by the lead 13 and resistor 31 is connected to ground by a lead 32, so that the voltage applied to deflection plate 27 corresponds to the output voltage of the system. By varying the relative values of resistors 30 and 31, the proportionality factor between the output voltage and the input voltage to the error sensing circuit may be controlled. The other deflection plate 28 is connected to ground through a lead 33, so that it will have no effect on the electron beam. If push-pull deflection is desired however, both plates may be used with a push-pull input signal applied to the error sensing circuit. A permanent bar magnet 34 is located adjacent the electron beam outside of the envelope of tube 16, so that its magnetic field will deflect the beam in opposition to the deflection caused by plate 27.

Since the permanent magnet 34 is extremely stable, it will maintain a constant deflecting field in the tube over long periods of time. It is therefore apparent that the deflection of the beam caused by the magnet will also be constant over long periods of time, so that a stable reference source is had. By varying the location and/or field strength of the magnet, the amount of deflection of the electron beam may be made to correspond to the desired value of the output voltage of the regulating system. Inasmuch as the deflection of the beam caused by plate 27 corresponds to the actual value of the system output voltage, the net deflection of the beam will correspond to the difference between the desired and actual values of the regulated voltage. Furthermore, the D.C. voltages appearing at the anodes 18 and 19 will become unequal when the beam is displaced from its neutral position, in which the deflections caused by the magnet 34 and the plate 27 are equal. A D.C. difference amplifier 35 of any suitable type, for example, such as is shown on page 113, para. 6–9 of "Electron Tube Circuits," by Samuel Seely, published by McGraw Hill, 1950, is connected by leads 36 and 37 to the anodes 18 and 19, so that an error signal representing the difference between the anode voltages appears at the output of the amplifier. This error signal will then correspond to the difference between the actual and desired values of the regulated voltage.

In order to compensate for the effects of changes in ambient temperature on permanent magnet 34, which may cause variations in the strength of the magnetic deflecting field in the tube, the invention provides for the inclusion of novel temperature compensating means. The compensating means comprise a bar-shaped magnetic shunt 38, which is arranged substantially parallel to the bar magnet 34, and a temperature responsive bi-metallic strip 39 which is connected by any suitable means (not shown) to adjacent ends of the shunt and magnet. With changes in temperature, the strip 39 will flex and vary the spacing between the shunt and magnet, so that more or less flux from the magnet will be diverted through the shunt. Thus, the strength of the magnetic deflecting field in the tube may be varied in accordance with temperature, in opposition to the variations in field strength with temperature due to changes in the magnet itself, so that the resulting deflecting field in the tube will remain constant. By this means, the permanent magnet 34 can be made to produce a constant reference deflection of the electron beam under virtually all conditions of operation, with the result that the accuracy of the regulating system, in which it is used, will be maintained over long periods of time.

Figure 2:
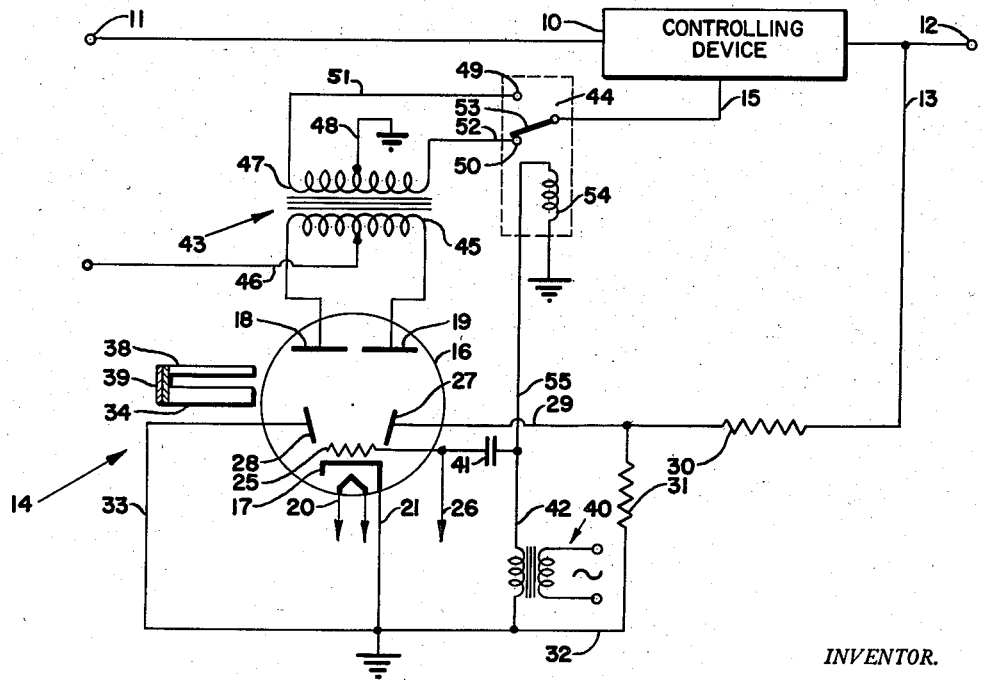
Fig. 2 is a schematic circuit diagram of another embodiment of the invention.

Referring now to Fig. 2 of the drawing, there is shown an embodiment of the invention in which the electron beam in tube 16 is modulated in intensity, so that A.C. signals appear at anodes 18 and 19. In describing the embodiment of Fig. 2, the same reference characters will be employed for the same elements appearing in both embodiments of the invention. The control grid 25, in this arrangement, is coupled to an A.C. supply source 40 by means of a capacitor 41 and a lead 42, so that the intensity of the electron beam in the tube is effectively modulated by the applied A.C. "bias" from source 40. Capacitor 41 also acts as a blocking capacitor to the D.C. bias signals applied at lead 26. Since the intensity of the electron beam is modulated by the signals from source 40, it is apparent that A.C. voltage signals will appear at anodes 18 and 19. The differential circuit means in this embodiment of the invention consists of a transformer, indicated generally as 43, and a demodulator, indicated generally as 44. Primary winding 45, of transformer 43, is coupled across the anodes 18 and 19 of the tube and has a center tap which is connected to a source of plate supply voltage (not shown), by means of a lead 46. The secondary winding 47 of the transformer is center-tapped and grounded at 48, and the winding itself, connected across fixed contacts 49 and 50 of the demodulator 44 by means of leads 51 and 52. While the demodulator may be of any suitable type, it is shown as a synchronous-switch having a movable contact 53, which is driven by a coil 54, and which cooperates with fixed contacts 49 and 50 to convert the A.C. signals from the transformer to pulsating D.C. signals. The output from the demodulator is taken from movable contact 53 and is applied as an error signal to controlling device 10 by lead 15. In order to synchronize the operation of the demodulator 44 with the frequency of the A.C. signals at anodes 18 and 19, the coil 54 is energized from A.C. supply source 40 through a lead 55.

In operation, this embodiment of the invention is quite similar to that disclosed in Fig. 1 of the drawing, in that the beam is deflected by both the deflection plate 27 and the permanent magnet 34, so that the net displacement of the beam corresponds to the difference between the actual and desired values of the regulated voltage. However, in this arrangement, the intensity of the electron beam is modulated by the A.C. supply source 40, so that A.C. voltage signals appear at the anodes 18 and 19. When the beam is in its undeflected, or neutral, position, the A.C. voltages across the primary winding 45 due to anodes 18 and 19 will be opposed and there will be no net voltage across the secondary winding 47. Thus, the error voltage signal appearing at the movable contact 53 of the demodulator will be zero. When the beam is displaced from its neutral position due to a deviation of the regulated voltage from its desired value, the voltages at anodes 18 and 19 will become unequal, with the result that a voltage will be induced across secondary winding 47. Since the synchronous-switch 44 is synchronized to the frequency of the modulating A.C. voltage from source 40, it will function in the well known manner of a demodulator to produce a pulsating D.C. error voltage at its output. If desired, the pulsating D.C. error voltage may be filtered in a well known manner to pass only the D.C. component to the controlling device 10.

It will be understood that the foregoing illustrated embodiments of the invention could be varied by obvious expedients without departing from the scope of the invention. For example, the electrostatic deflection plate 27 in the tube 16 could be replaced by an electromagnetic deflection coil. This arrangement would be especially suited for applications, such as current regulators, where large signal current are available to drive the coil, and for other applications, where the inductive time delay caused by the coil is not of great importance. Furthermore, the described temperature compensating means could be replaced by any arrangement which varies the strength of the deflecting field produced by the magnet in accordance with temperature changes, so that the net strength of the field produced by the magnet, which deflects the electron beam, remains unchanged. Accordingly, it is intended that all matter contained in the above description, or shown in the accompanying drawing shall be interpreted as illustrative and not in a limiting sense.

What is claimed is:

1. An error sensing circuit for use in regulators and the like, comprising an electron discharge device having means for producing a deflectable electron beam of regularly varying intensity, deflection means for deflecting the beam, a pair of anodes so located within said discharge device that the difference between the signals appearing at said anodes due to the eelctron beam corresponds to the net deflection of the beam, said deflection means being coupled to a source of signals corresponding to the actual value of a quantity being regulated to deflect the beam by an amount corresponding to the actual value of the regulated quantity; permanent magnet means located adjacent the electron beam and operable to deflect the beam in opposition to said deflection means by an amount corresponding to a desired value of the regulated quantity, so that the net deflection of the beam corresponds to the difference between the actual and desired values of the regulated quantity; and differential circuit means comprising a transformer and a demodulator, said transformer having a primary winding connected across said anodes and a secondary winding coupled to said primary and connected to the input of said demodulator, whereby said difference signal appears at the output of said demodulator.

2. An error sensing circuit as claimed in claim 1, whereby said beam producing means includes a control grid adapted to be coupled to a source of A.C. supply signals, and said demodulator comprises a vibrating element type of synchronous switch adapted to be driven by said source of A.C. supply signals.

3. An error sensing circuit as claimed in claim 1, which further comprises temperature compensating means operable to compensate for the variations in strength of the magnetic deflecting field of said magnet means due to changes in temperature, said compensating means comprising a magnetic shunt located adjacent said magnet means and a temperature responsive bi-metallic element interconnecting said shunt and said magnet means, said bi-metallic element being operable to cause relative movement between said shunt and said magnet means in response to changes in temperature, whereby the deflection of the electron beam due to said magnet means remains constant with changes in temperature.

References Cited in the file of this patent

UNITED STATES PATENTS

| | | |
|---|---|---|
| 2,383,758 | Ziebolz | Aug. 28, 1945 |
| 2,668,272 | Groth | Feb. 2, 1954 |
| 2,799,813 | Rademakers et al. | July 16, 1957 |